United States Patent
Nishijima et al.

(10) Patent No.: US 9,731,524 B2
(45) Date of Patent: Aug. 15, 2017

(54) CUTTER BLADE MOVING MECHANISM, CUTTER, AND PRINTER

(71) Applicant: Seiko Epson Corporation, Tokyo (JP)

(72) Inventors: Hideaki Nishijima, Shiojiri (JP); Tetsugo Ishida, Yamagata-mura (JP); Hiroshi Narita, Yamagata-mura (JP); Rikuo Yamada, Yamagata-mura (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 14/988,429

(22) Filed: Jan. 5, 2016

(65) Prior Publication Data

US 2016/0221370 A1 Aug. 4, 2016

(30) Foreign Application Priority Data

Jan. 5, 2015 (JP) .................................. 2015-000113
Jan. 5, 2015 (JP) .................................. 2015-000117

(51) Int. Cl.
*B41J 11/70* (2006.01)
*B26D 1/08* (2006.01)
*F16H 19/02* (2006.01)
*F16H 19/04* (2006.01)

(52) U.S. Cl.
CPC ................. *B41J 11/70* (2013.01); *B26D 1/08* (2013.01); *F16H 19/02* (2013.01); *F16H 19/04* (2013.01)

(58) Field of Classification Search
CPC ............ B41J 11/70; F16H 19/02; F16H 19/04
See application file for complete search history.

(56) References Cited

U.S. PATENT DOCUMENTS 6,831,670 B2* 12/2004 Fujiwara ................ B41J 11/006
346/24
2015/0283831 A1* 10/2015 Vandermeulen ....... B26D 1/085
347/104

FOREIGN PATENT DOCUMENTS

| JP | 2005-161481 A | 6/2005 |
| JP | 2011-140109 A | 7/2011 |
| JP | 2013-220566 A | 10/2013 |

* cited by examiner

*Primary Examiner* — Thinh H Nguyen
(74) *Attorney, Agent, or Firm* — Nutter McClennen & Fish LLP; John J. Penny, Jr.

(57) ABSTRACT

A cutter blade moving mechanism moves a cutter blade to a forward position by a low output drive motor without an urging member urging the cutter blade to the forward position where media is cut. The first cutter blade moving mechanism has a drive gear that moves the first cutter blade forward and back; a drive motor; and a compound gear to which rotation of the drive motor is transferred. The intermittent teeth part of the compound gear meshes with a transfer gear after turning the compound gear is started by drive power from the drive motor, completing a rotation transfer path. Because there is a delay between when driving the drive motor starts and when the path transferring rotation from the drive motor to the drive gear is completed, rotational kinetic energy is stored in the compound gear during this delay. The transfer gear can therefore be turned with greater drive power (rotational kinetic energy) when the compound gear and transfer gear mesh.

11 Claims, 9 Drawing Sheets

CUTTER BLADE MOVING MECHANISM, CUTTER, AND PRINTER

Priority is claimed under 35 U.S.C. §119 to Japanese Patent Application Nos. 2015-000113 and 2015-00117 filed on Jan. 5, 2015.

BACKGROUND

1. Technical Field

The present invention relates to a cutter moving mechanism configured to move a cutter blade linearly and cut sheet media, and to a cutter. The invention also relates to a printer having the cutter.

2. Related Art

A printer with a cutter is described in JP-A-2005-161481. The cutter in JP-A-2005-161481 has cutter blade moving mechanism that drives a cutter blade reciprocally between a forward position where the recording paper is cut and a retracted position separated from the forward position. The cutter blade moving mechanism has a drive motor, two cutter drive gears to which drive power is transferred from the drive motor, and a guide that guides the movable knife in the forward/back direction. The two cutter drive gears are arranged in a perpendicular direction perpendicular to the forward/back direction of travel of the movable knife with their axes of rotation perpendicular to the plane of travel of the movable knife. The two cutter drive gears mesh together and rotate synchronously. Each cutter drive gear has a drive pin disposed at a position offset from the center of the end face. Oval holes with the long axis extending in the perpendicular direction are formed in the movable knife, and the drive pins of the cutter drive gears are inserted to these holes.

When the two cutter drive gears are turned by the drive power from the drive motor, the drive pins move in the forward/back direction of the movable knife while moving in the perpendicular direction inside the oval holes. The drive pins therefore contact the sides of the oval holes and move the movable knife in the forward/back direction. When the cutter drive gears turn one revolution, the movable knife travels between the forward position overlapping the fixed knife and then back to the retracted position forming a gap between the movable knife and the fixed knife. The cutter blade moving mechanism described in JP-A-2005-161481 has a coil spring that urges movable knife from the retracted position to the forward position.

In the cutter blade moving mechanism described in JP-A-2005-161481, the coil spring assists moving the cutter blade from the retracted position to the forward position. A low cost drive motor with relatively low output can therefore be used to drive the cutter blade. However, with a configuration that uses a coil spring to urge the cutter blade to the forward position, vibration, for example, can cause the movable knife to move toward the forward position. This creates a safety problem.

SUMMARY

A cutter and a cutter blade moving mechanism according to at least one embodiment of the invention can move a cutter blade from a retracted position to a forward position using a relatively low output drive motor without urging the cutter blade toward the forward position where media is cut. The invention also provides a printer having the cutter.

A cutter blade moving mechanism configured to move a cutter blade reciprocally between a forward position cutting a sheet medium and a retracted position separated from the forward position includes: a first gear; a second gear; a rotation conversion mechanism configured to move a cutter blade forward and back by rotation of the first gear; a drive motor; an intermittent gear; and a transfer mechanism configured to transfer rotation from the drive motor through the intermittent gear to the first gear. The toothed part of the intermittent gear engages the second gear after the drive motor starts turning the intermittent gear; and while the toothed part of the intermittent gear is engaged with the second gear and rotation from the drive motor is transferred to the first gear, the cutter blade is moved by the rotation conversion mechanism from the retracted position to the forward position.

After driving the drive motor causes the intermittent gear to start turning, the toothed part of the intermittent gear meshes with the second gear and completes the path through which rotation is transferred (referred to below as the "rotation transfer path") from the drive motor to the first gear. As a result, there is a time difference (delay) between when the drive motor starts driving and when the rotation transfer path is completed. The drive motor therefore does not move the cutter blade before the rotation transfer path is completed, and the load on the drive motor is reduced accordingly. The speed of the drive motor can therefore increase during this time difference. If the speed of the drive motor increases, rotational kinetic energy can be stored in the drive motor and intermittent gear. The second gear can therefore be turned with greater drive power (rotational kinetic energy) when the intermittent gear and second gear engage than when driving the drive motor starts with the gears already meshed. As a result, the first gear can be turned with greater power than the output power of the drive motor when starting to move the first cutter blade. A drive motor with relatively low output can therefore be used as the drive motor to move the cutter from the retracted position to the forward position.

To transfer drive power from the drive motor through the intermittent gear to the first gear, the second gear of the transfer mechanism is on the downstream side of the rotational path of the intermittent gear in a cutter blade moving mechanism according to another aspect of at least one embodiment of the invention.

To transfer drive power from the intermittent gear through the second gear to the first gear in a cutter blade moving mechanism according to another aspect of at least one embodiment of the invention, the transfer mechanism has a third gear. The third gear is located between the first gear and the second gear, the third gear meshes with the first gear, and the third gear meshes with the second gear.

In another aspect of at least one embodiment of the invention, the rotation conversion mechanism is a rack and pinion mechanism.

By using a rack and pinion mechanism, the rotational angle of the first gear and the distance the cutter blade moves can be desirably controlled. The cutter blade can therefore be moved more accurately than when a linkage mechanism is used for the rotation conversion mechanism.

The cutter blade moving mechanism according to another aspect of at least one embodiment of the invention preferably also has an urging member configured to urge the cutter blade, and the urging force of the urging member moves the cutter blade from the forward position to the retracted position when the toothed part of the intermittent gear and the second gear disengage.

Thus comprised, the cutter blade can be easily returned to the retracted position.

In another aspect of at least one embodiment of the invention, the drive motor is a DC motor.

Because low output DC motors are inexpensive, the production cost of the cutter blade moving mechanism can be suppressed.

Another aspect of at least one embodiment of the invention is a cutter, comprises: the cutter blade moving mechanism described above; a first cutter blade that is moved between the forward position and the retracted position by the cutter blade moving mechanism; and a second cutter blade configured to contact the first cutter blade moving from the retracted position to the forward position.

Thus comprised, a relatively low output drive motor can be used to drive the first cutter blade. The production cost of the cutter can therefore be suppressed.

A cutter according to another aspect of at least one embodiment of the invention has a support mechanism configured to support the second cutter blade parallel to the plane of bidirectional movement of the first cutter blade, and pivotably on an axis of rotation perpendicular to the direction of travel of the first cutter blade; and an urging member configured to urge the second cutter blade to a contact position where the cutting edge of the second cutter blade can slide against the first cutter blade. The second cutter blade contacts the first cutter blade at the contact position with an imaginary line between the axis of rotation and the cutting edge of the second cutter blade at an incline to the travel plane of the first cutter blade.

Thus comprised, the urging force of the urging member works from the cutting edge of the second cutter blade in a direction perpendicular to the plane of travel of the first cutter blade. The media cutting load produced when cutting media extends from the cutting edge of the second cutter blade to the front in the direction of travel of the first cutter blade. Because the second cutter blade is supported pivotably on an axis of rotation parallel to the plane of travel, the combined force of the urging force of the urging member and the media cutting load works on the cutting edge of the second cutter blade as a moment around the axis of rotation when cutting sheet media. This moment pushes the cutting edge of the second cutter blade to the first cutter blade side. Therefore, the second cutter blade can be pushed to the contact position using the media cutting load produced when cutting media in addition to the urging force of the urging member. As a result, the second cutter blade can be pushed against the first cutter blade with force sufficient to cut even when the urging force of the urging member is relatively small. Wear of the first cutter blade and second cutter blade can therefore be suppressed, and the load on the cutter blade moving mechanism that moves the first cutter blade can be reduced. When the media cutting load increases, such as when cutting thick media, the moment applied to the second cutter blade increases in conjunction with the increased media cutting load, and the second cutter blade can be pushed with greater force to the media side (the first cutter blade side). Even thick media can therefore be cut cleanly.

A cutter according to another aspect of at least one embodiment of the invention also has a second cutter blade moving mechanism configured to rock the second cutter blade on its axis of rotation between a release position where the cutting edge is separated from the travel plane, and the contact position. The second cutter blade moving mechanism sets the second cutter blade to the release position before the cutter blade moving mechanism moves the first cutter blade from the forward position to the retracted position.

Thus comprised, contact between the first cutter blade and the second cutter blade can be eliminated throughout the return path of the first cutter blade from the forward position to the retracted position. Wear on the two cutter blades after the media is cut can therefore be prevented.

Another aspect of at least one embodiment of the invention is a printer comprising the cutter described above; a printhead; and a conveyance mechanism configured to convey sheet media through a conveyance path passing the printing position of the printhead and the cutting position of the cutter.

Thus comprised, the manufacturing cost of a printer with a cutter can be reduced because the manufacturing cost of the cutter can be reduced.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer according to the present invention is described below with reference to the accompanying figures.

General Configuration

Figure 1A:
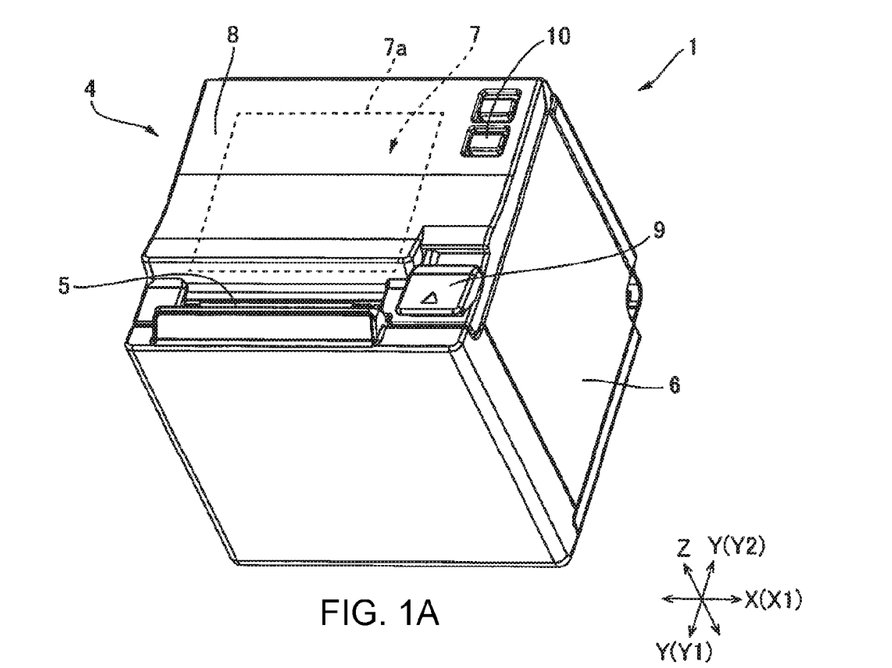
FIGS. 1A and 1B are oblique views of a printer according to the invention.
Figure 1B:
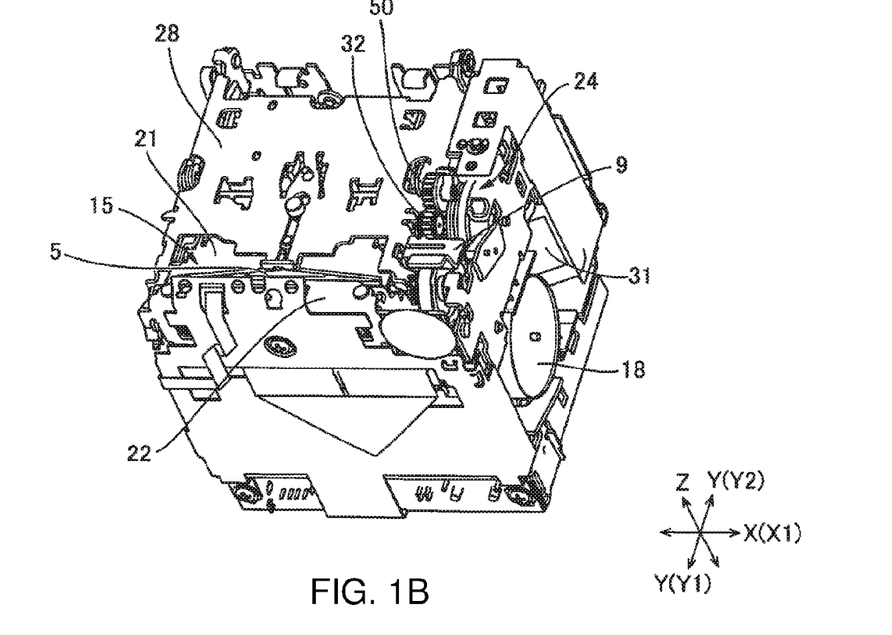
Figure 2:
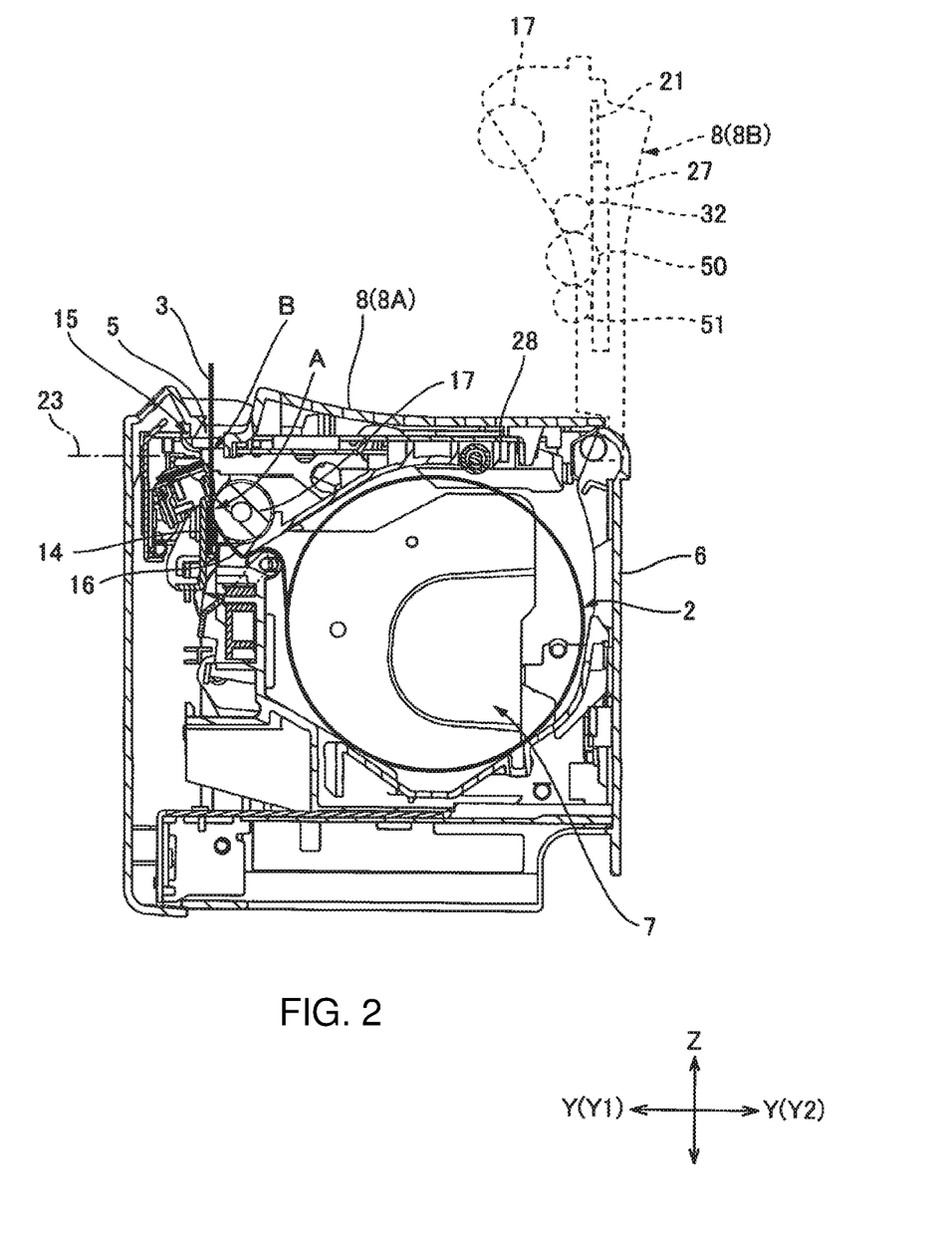
FIG. 2 is a schematic section views of the printer in FIGS. 1A and 1B.

FIG. 1A is an oblique view of a printer according to this embodiment of the invention, and FIG. 1B is an oblique view of the printer in (a) without the outside case. FIG. 2 is a section view of the printer in FIGS. 1A and 1B.

The printer 1 in this example is a roll paper printer that prints on recording paper 3 (sheet media) delivered from a paper roll 2. As shown in FIG. 1A, the printer 1 has a basically box-like printer case 4. A paper exit 5 from which the recording paper 3 is discharged is formed in the top front part of the printer case 4. The paper exit 5 extends widthwise to the printer 1.

Note that three mutually perpendicular axes, the transverse axis X aligned with the printer width, longitudinal axis Y, and vertical axis Z, are used below.

The printer case 4 includes a box-like main case 6, and an access cover 8 that opens and closes the top of the main case 6. The main case 6 has an roll paper compartment 7 inside (see FIG. 2), and the cover 8 covers the roll paper loading opening 7a from above (above on the vertical axis Z) (see FIG. 1A).

The cover 8 is attached at the back Y2 (the back Y2 on the longitudinal axis Y) behind the paper exit 5. A release button 9 is disposed beside the cover 8 on one side X1 on the transverse axis X. A power switch 10 is disposed behind the release button 9 at the back Y2. Operating the release button 9 unlocks the cover 8. When unlocked, the cover 8 can pivot on a spindle extending on the transverse axis X. The cover 8 moves between an closed position 8A where the cover 8 is horizontal and closes the roll paper compartment 7 as shown in FIG. 1A, and an open position 8B where the cover 8 is upright and the roll paper compartment 7 is open as indicated by the dotted line in FIG. 2.

As shown in FIG. 2, inside the printer case 4 are a printhead 14 and a cutter 15. Also inside the printer case 4 is the conveyance path 16 through which the recording paper 3 travels from the roll paper compartment 7, past the printing position A of the printhead 14, past the cutting position B of the cutter 15, and to the paper exit 5.

The printhead 14 can be a thermal head. The printing position A is defined by a platen roller 17 opposite the printhead 14. Torque from a conveyance motor 18 is transferred to the platen roller 17. The platen roller 17 and conveyance motor 18 embody the conveyance mechanism that conveys the recording paper 3 through the conveyance path 16.

The printer 1 drives the conveyance motor 18 to turn the platen roller 17 and convey the recording paper 3 set in the conveyance path 16 at a specific speed. The printer 1 also drives the printhead 14 to print on the recording paper 3 as it travels past the printing position A. The printer 1 also drives the cutter 15 to cut the recorded part of the recording paper 3 after printing is completed.

Cutter

Figure 3:
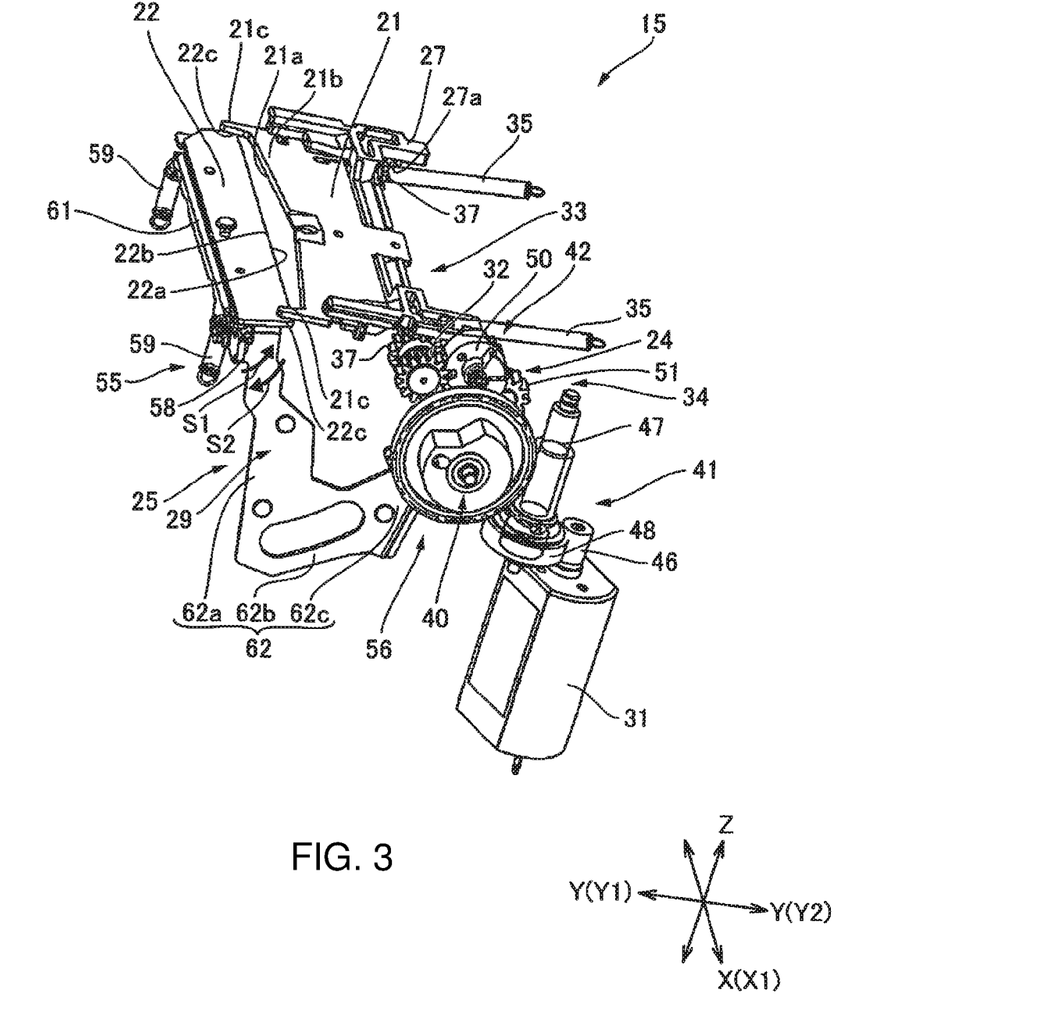
FIG. 3 is an oblique view of the cutter.
Figure 4:
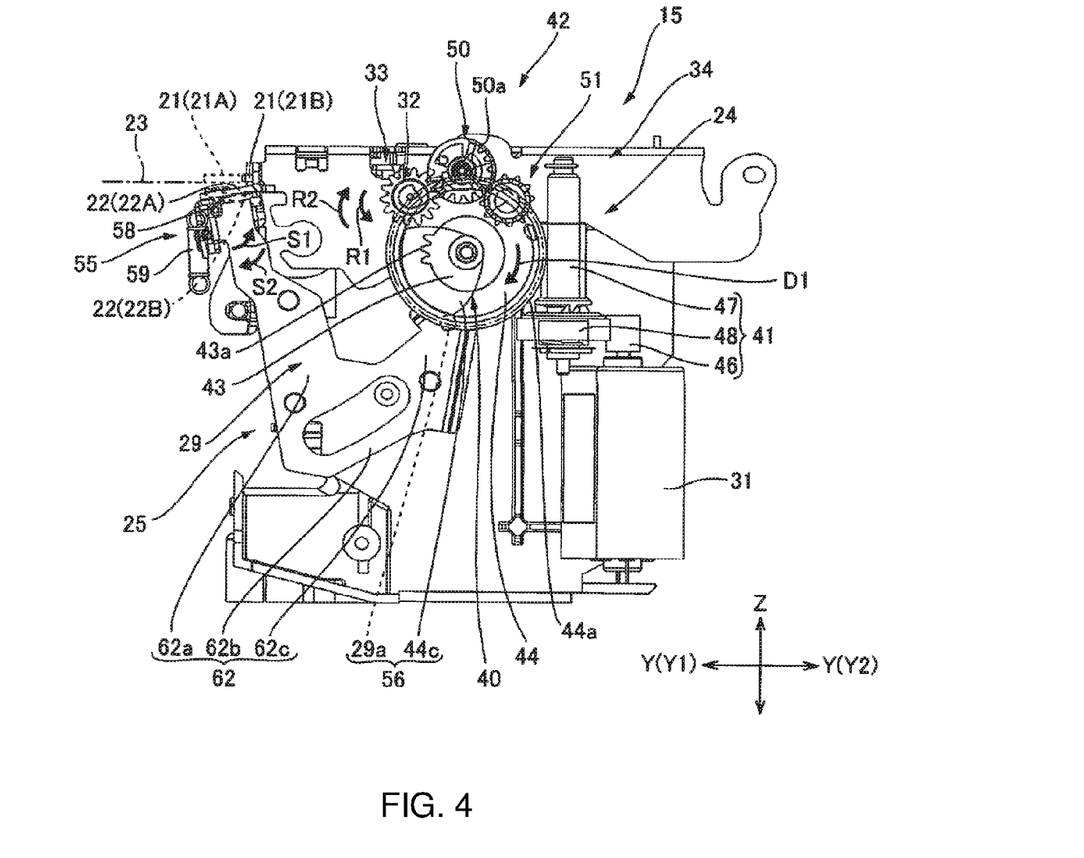
FIG. 4 is a side view of the cutter.

FIG. 3 is an oblique view of the cutter 15. FIG. 4 is a side view of the cutter 15. Note that the intermittent teeth part 43a and the cam 44c of the compound gear 40 are shown in FIG. 4 for easier understanding.

As shown in FIG. 1B and FIG. 3, the cutter 15 has a first cutter blade 21 and a second cutter blade 22 that work together to cut the recording paper 3. The cutter 15 also has a first cutter blade moving mechanism 24 (cutter blade moving mechanism) that moves the first cutter blade 21 along a predetermined plane of travel 23 (see FIG. 2). The plane of travel 23 is a plane that intersects the conveyance path 16 at the cutting position B below the paper exit 5 and is perpendicular to the vertical axis Z. As shown in FIG. 4, the first cutter blade moving mechanism 24 moves the first cutter blade 21 reciprocally between the forward position 21A where the recording paper 3 is cut, and a retracted position 21B separated from the forward position 21A.

The cutter 15 also has a second cutter blade moving mechanism 25 (second cutter blade moving mechanism) that causes the second cutter blade 22 to rock between a contact position 22A where the second cutter blade 22 slides against the first cutter blade 21 to cut the recording paper 3, and a release position 22B where the second cutter blade 22 is separated from the first cutter blade 21 (plane of travel 23).

The cutter 15 cuts the recording paper 3 on the conveyance path 16 at the cutting position B by moving the first cutter blade 21 from the retracted position 21B to the forward position 21A when the second cutter blade 22 is at the contact position 22A.

As shown in FIG. 3, the cutting edge 21a of the first cutter blade 21 faces the front Y1 (the front Y1 of the printer 1 on the longitudinal axis Y). The first cutter blade 21 is a flat blade with a plane shape that is left-right symmetrical. The front edge of the first cutter blade 21 forms a V-shaped knife edge 21b that narrows to the back Y2 in the center on the transverse axis X. The first cutter blade 21 also has a pair of lift guides 21c that protrude to the front Y1 on the opposite ends of the knife edge 21b on the transverse axis X. The lift guides 21c extend to a position resting on the matching ends (seat parts 22c) of the second cutter blade 22 when seen on the vertical axis Z. The back end of the first cutter blade 21 is supported by a rack member 27. The first cutter blade 21 and rack member 27 are supported by the cover side frame 28 (FIG. 1B), which can move on the longitudinal axis Y.

The cutting edge 22a of the second cutter blade 22 faces the back Y2. The second cutter blade 22 is a flat, rectangular blade that extends along on the transverse axis X. The second cutter blade 22 has seat parts 22c on the back (the side facing the first cutter blade 21) at opposite ends on the transverse axis X. The lift guides 21c of the first cutter blade 21 slide in contact with the tops of the seat parts 22c. The knife edge 22b of the second cutter blade 22 extends in a straight line on the transverse axis X between the lift guides 21c. The second cutter blade 22 is carried by a support frame 29.

As shown in FIG. 3, the first cutter blade moving mechanism 24 includes a drive motor 31 as the drive source, a drive gear 32 (first gear), a rotary to linear conversion mechanism 33 (rotation conversion mechanism) for converting rotation of the drive gear 32 to linear motion and moving the first cutter blade 21 reciprocally on the plane of travel 23, and a transfer mechanism 34 for transferring rotation of the drive motor 31 to the drive gear 32. The first cutter blade moving mechanism 24 also has an urging member that urges the first cutter blade 21 from the forward position 21A side to the retracted position 21B. The urging member in this example is a coil spring 35.

The rotary to linear conversion mechanism 33 in this example is a rack and pinion mechanism. More specifically, the rotary to linear conversion mechanism 33 has a pinion 37 disposed coaxially to and rotating in unison with the drive gear 32, and a rack 27a disposed on the rack member 27 that supports the first cutter blade 21. The pinion 37 meshes with the rack 27a. The drive motor 31 is a DC motor, and is driven rotationally in one direction. In this example, the rotary to linear conversion mechanism 33 moves the first cutter blade 21 from the retracted position 21B to the forward position 21A by turning the drive gear 32 a specific angle of rotation in a first direction of rotation R1 (see FIG. 4).

The transfer mechanism 34 includes a compound gear (intermittent gear) 40, an upstream transfer mechanism 41, and a downstream transfer mechanism 42. The upstream transfer mechanism 41 is positioned on the upstream side of the compound gear 40 on the transfer path of rotation from the drive motor 31, and the downstream transfer mechanism 42 is on the downstream side of the compound gear 40. The first cutter blade 21 travels round trip to the forward position 21A and back to retracted position 21B while the compound gear 40 is turned one revolution by driving the drive motor 31.

The compound gear 40 is supported on a rotary shaft extending on the transverse axis X below the plane of travel 23 of the first cutter blade 21. As shown in FIG. 4, the compound gear 40 has an intermittent gear part 43 and a large diameter gear part 44. The intermittent gear part 43 has intermittent teeth (toothed part) 43a formed through a specific angular range. The large diameter gear part 44 is larger in diameter than the intermittent gear part 43, and is formed coaxially to the intermittent gear part 43. The large diameter gear part 44 is located on the one side X1 (outside side) of the intermittent gear part 43 on the transverse axis X. The large diameter gear part 44 has teeth (toothed part) 44a around the full outside circumference.

The compound gear 40 also has a cam 44c. The cam 44c is formed in unison with the intermittent teeth part 43a and large diameter gear part 44.

The upstream transfer mechanism 41 has a pinion 46 disposed on the output shaft of the drive motor 31, a worm 47 to which rotation of the pinion 46 is transferred, and a clutch mechanism 48 between the worm 47 and the pinion 46.

The drive motor 31 is disposed on the output shaft on the vertical axis Z. The rotary shaft of the worm 47 is also on the vertical axis Z. The worm 47 meshes with the toothed part 44a of the large diameter gear part 44 in the compound gear 40. The clutch mechanism 48 disengages the worm 47 and the pinion 46 when, for example, great torque is input from the downstream side to the upstream side of the transfer path of rotation. The clutch mechanism 48 thus prevents damage to the first cutter blade moving mechanism 24.

The downstream transfer mechanism 42 includes an idler gear 50 (third gear) that meshes with the drive gear 32, and a transfer gear 51 (second gear) that transfers rotation of the compound gear 40 to the idler gear 50. The drive gear 32, idler gear 50, and transfer gear 51 are located above the intermittent gear part 43 of the compound gear 40. The drive gear 32, idler gear 50, and transfer gear 51 are also arranged in this order from the front Y1 to the back Y2. The rotary shaft of the drive gear 32 is located in front Y1 of the compound gear 40 shaft, and the rotary shaft of the transfer gear 51 is located in back Y2 of the compound gear 40 shaft. The transfer gear 51 is disposed on the downstream side of the rotational path of the intermittent gear part 43.

The transfer gear 51 can mesh with the intermittent teeth part 43a of the compound gear 40 (intermittent gear part 43). The idler gear 50 is an intermittent gear. The intermittent teeth part 50a of the idler gear 50 meshes with both the drive gear 32 and the transfer gear 51. Note that the idler gear 50 is a common gear with teeth around its full circumference.

A pair of coil springs 35 extend on the longitudinal axis Y at positions separated on the transverse axis X. The front end of each coil spring 35 is attached to the rack member 27, and the back end is attached to the cover side frame 28.

While the compound gear 40 to which rotation of the drive motor 31 is transferred turns one revolution and the intermittent teeth part 43a of the compound gear 40 and the transfer gear 51 are engaged, rotation of the compound gear 40 is transferred from the transfer gear 51 of the compound gear 40 through the idler gear 50 to the drive gear 32. The drive gear 32 therefore turns only a specific angle of rotation in the first direction of rotation R1. As a result, the first cutter blade 21 moves from the retracted position 21B to the forward position 21A. The coil springs 35 therefore stretch and store urging force when the first cutter blade 21 moves from the retracted position 21B to the forward position 21A. The first cutter blade moving mechanism 24 therefore moves the first cutter blade 21 from the retracted position 21B to the forward position 21A in resistance to the urging force of the coil springs 35.

When the compound gear 40 then turns further and the intermittent teeth part 43a of the compound gear 40 and the transfer gear 51 disengage, the stored urging force of the coil springs 35 pull the first cutter blade 21 from the forward position 21A to the retracted position 21B. More specifically, when the intermittent teeth part 43a of the compound gear 40 and the transfer gear 51 disengage, the rotation transfer path of the transfer mechanism 34 from the drive motor 31 to the drive gear 32 is interrupted. As a result, the transfer gear 51, idler gear 50, and drive gear 32 rotate freely, and the first cutter blade 21 is moved to the back and returns to the retracted position 21B by the urging force of the coil springs 35.

The platen roller 17, the upstream transfer mechanism 41 of the first cutter blade moving mechanism 24 (the transfer gear 51 and idler gear 50), the drive gear 32, rack member 27, first cutter blade 21, and coil springs 35 are supported by the cover side frame 28. The platen roller 17, upstream transfer mechanism 41, drive gear 32, rack member 27, first cutter blade 21, and coil springs 35 therefore rotate with the cover 8 and separate from the main case 6 when the cover 8 opens.

As shown in FIG. 4, at the contact position 22A where the second cutter blade can contact the first cutter blade 21, the second cutter blade 22 is inclined toward the retracted position 21B of the first cutter blade 21 (toward the back Y2) in the direction approaching the plane of travel 23 of the first cutter blade 21. In this inclined position, the cutting edge 22a of the second cutter blade 22 is on the plane of travel 23. By displacing the cutting edge 21a from this inclined position downward away from the plane of travel 23, the second cutter blade moving mechanism 25 moves the second cutter blade 22 from the contact position 22A to the release position 22B.

The second cutter blade moving mechanism 25 is assembled below the plane of travel 23 of the first cutter blade 21. As shown in FIG. 3 and FIG. 4, the second cutter blade moving mechanism 25 has a support mechanism 55 and a linkage mechanism 56. The support mechanism 55 supports the second cutter blade 22 rockably around a specific axis of rotation. The linkage mechanism 56 causes the second cutter blade 22 to rock synchronized to movement of the first cutter blade 21 by the first cutter blade moving mechanism 24.

As shown in FIG. 3, the support mechanism 55 includes the support frame 29 that carries the second cutter blade 22, a support shaft 58 that rockably supports the support frame 29, and urging members 59 that urge the second cutter blade 22 to the contact position 22A by urging the support frame 29. The urging members 59 are coil springs in this example.

As shown in FIG. 4, the support frame 29 includes a cutter support part 61 and a linkage frame part 62. The cutter support part 61 extends on the transverse axis X and supports the second cutter blade 22 from below. The linkage frame part 62 extends down from the one side X1 side end of the cutter support part 61 on the transverse axis X. The linkage frame part 62 has a front frame part 62a that extends down, a middle frame part 62b that extends to the back Y2 from the bottom end of the front frame part 62a, and a back frame part 62c that extends up from the back end part of the middle frame part 62b. A cam follower 29a that can contact the cam 44c of the compound gear 40 is disposed at the top end of the back frame part 62c.

The support shaft 58 passes through the front top part of the front frame part 62a on the transverse axis X. The support shaft 58 is the rotary shaft of the second cutter blade 22, and the axis of the support shaft 58 is the rocking axis (axis of rotation) of the second cutter blade 22. The urging members 59 urge the front top part of the front frame part 62a that is located on the opposite side of the support shaft 58 as the cutting edge 21a of the second cutter blade 22 down.

The cam follower 29a of the support frame 29 and the cam 44c of the compound gear 40 form the linkage mechanism 56. While the compound gear 40 turns one revolution and the cam follower 29a and cam 44c of the compound gear 40 are not touching, the support frame 29 is urged in the counterclockwise urging direction S1 indicated by the arrows in FIG. 3 and FIG. 4 around the support shaft 58 by the urging members 59. When the support frame 29 is urged in the counterclockwise urging direction S1, the lift guides 21c of the second cutter blade 22 contact the lift guides 21c of the first cutter blade 21 from below. The second cutter blade 22 is therefore set to the contact position 22A at an angle. When the second cutter blade 22 is in the contact position 22A, the second cutter blade 22 is pushed against the first cutter blade 21 by the urging force of the urging members 59.

When the compound gear 40 turns and the cam follower 29a of the support frame 29 and the cam 44c of the compound gear 40 contact, the back frame part 62c is displaced downward in resistance to the urging force of the urging members 59. As a result, the support frame 29 rotates clockwise S2 as shown by the arrows in FIG. 3 and FIG. 4 on the support shaft 58. As a result, the cutting edge 21a moves down from the plane of travel 23 and the second cutter blade 22 moves to the release position 22B not touching the first cutter blade 21. The second cutter blade 22 remains in the release position 22B while the cam follower 29a is in contact with the cam 44c of the compound gear 40.

The second cutter blade moving mechanism 25 sets the second cutter blade 22 to the contact position 22A before the first cutter blade moving mechanism 24 moves the first cutter blade 21 from the retracted position 21B to the forward position 21A. The second cutter blade moving mechanism 25 also moves the second cutter blade 22 to the release position 22B before the first cutter blade moving mechanism 24 moves the first cutter blade 21 from the forward position 21A to the retracted position 21B.

The operation whereby the cutter 15 cuts the recording paper 3 is described next with reference to FIG. 5A to FIG. 8D.

FIGS. 5A-5D show the cutter 15 in the standby position. FIGS. 6A-6D show immediately before the first cutter blade 21 starts moving. FIGS. 7A-7D show the first cutter blade 21 at the forward position 21A. FIGS. 8A-8D show the first cutter blade 21 at the retracted position 21B.

In each of FIGS. 5A-8D, A is a plan view of the cutter 15; B is a section view of the cutter 15 through a plane passing through the pinion 37 of the rotary to linear conversion mechanism 33; C is a side view of the cutter 15; and D is an enlarged view of the compound gear 40 and vicinity. In C and D, the intermittent teeth part 43a, cam 44c, and the cam follower 29a are shown to clearly illustrate their positions.

Figure 5A:
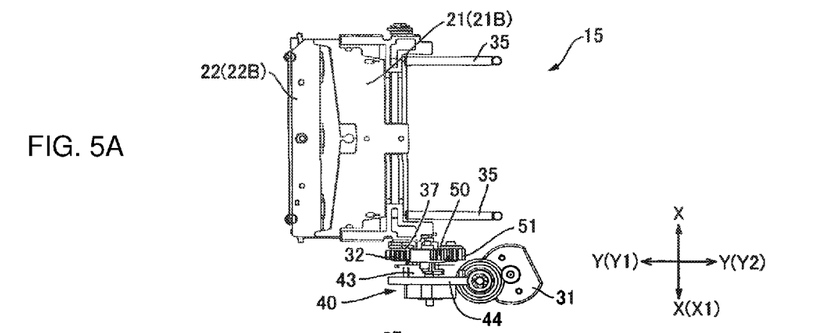
FIGS. 5A-5D illustrate the recording paper cutting operation of the cutter.
Figure 5B:
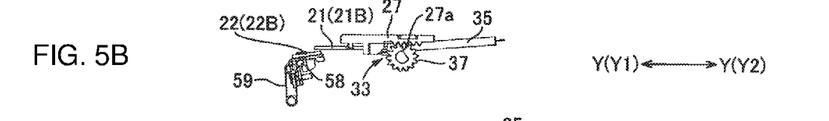
Figure 5C:
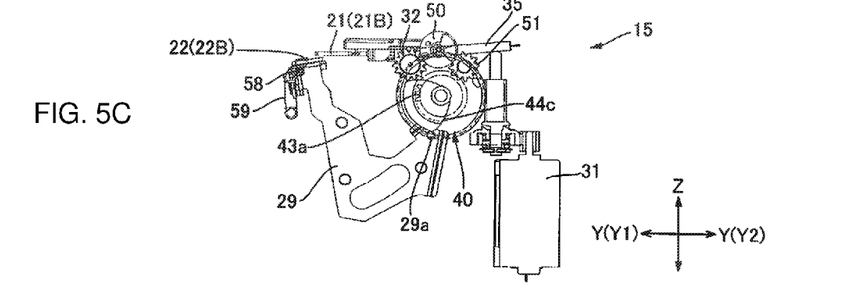
Figure 5D:
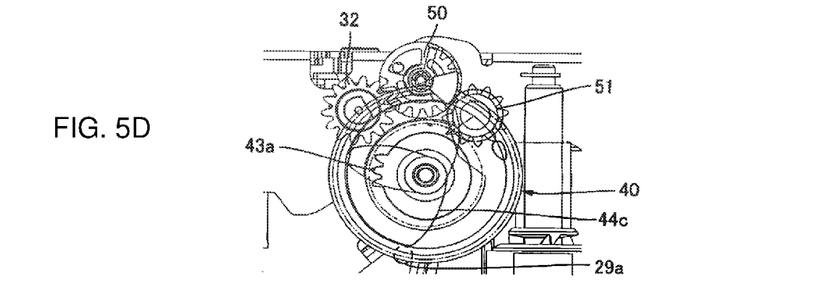

When the printer 1 is off and while the printer 1 is in the standby mode waiting to receive print data, the cutter 15 is in the standby position. In the standby position, as shown in FIG. 5A, the first cutter blade 21 is in the retracted position 21B. As shown in FIG. 5B, the pinion 37 coaxial to the drive gear 32 is meshed with the front end part of the rack 27a of the rack member 27. As shown in FIGS. 5C and D, the intermittent teeth part 43a of the compound gear 40 is at an angle separated from the transfer gear 51, and is not meshed with the transfer gear 51.

As shown in FIG. 5C, the cam follower 29a of the support frame 29 that supports the second cutter blade 22 is in contact with the cam 44c of the compound gear 40. As a result, the back frame part 62c of the support frame 29 is pushed down against the urging force of the coil springs 35, and the second cutter blade 22 is at the release position 22B separated from the first cutter blade 21.

When print data is supplied from an external device, the printer 1 drives the conveyance motor 18 to turn the platen roller 17 and convey the paper roll 2 set in the conveyance path 16 at a specific speed. The printer 1 also drives the printhead 14 to print on the recording paper 3 as it passes the printing position A. When printing is completed, the printer 1 drives the drive motor 31 a specific drive time in the same rotational direction. As a result, the cutter 15 operates and cuts the recorded part of the printed recording paper 3.

Figure 6A:
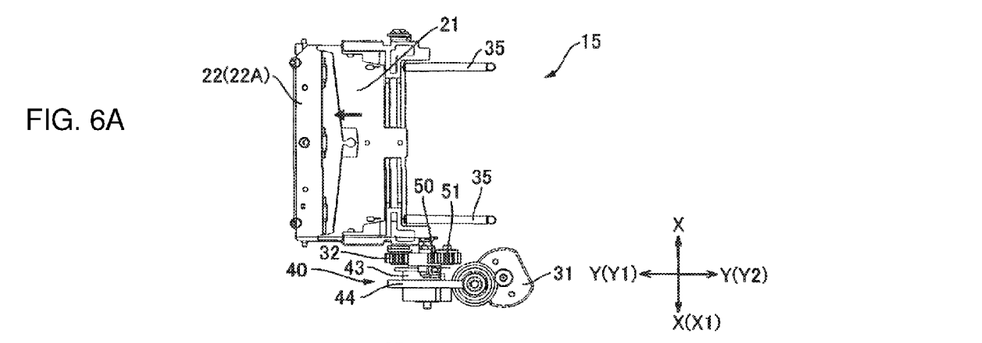
FIGS. 6A-6D illustrate the recording paper cutting operation of the cutter.
Figure 6B:
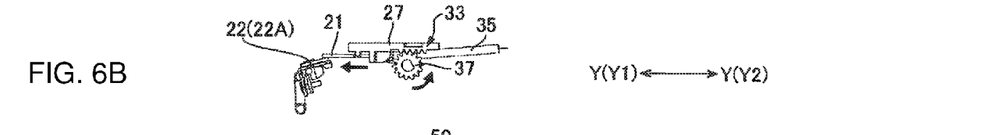
Figure 6C:
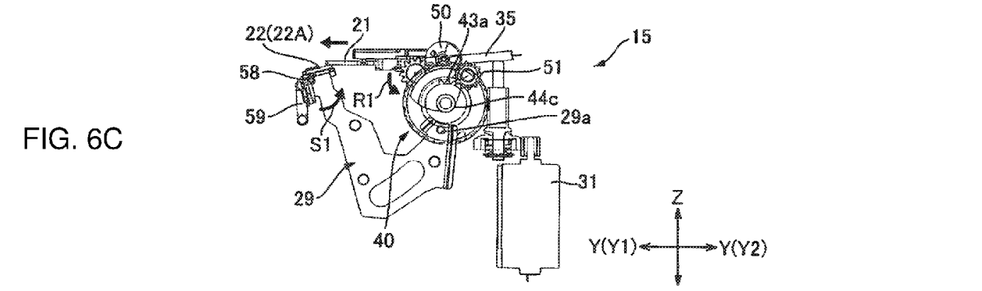

When the drive motor 31 is driven, the compound gear 40 starts turning in the direction of rotation D1 (clockwise). When the compound gear 40 turns, contact between the cam follower 29a of the support frame 29 and the cam 44c of the compound gear 40 is immediately released. As a result, the support frame 29 turns counterclockwise S1 on the support shaft 58 due to the urging force of the urging members 59 (FIG. 6C). As a result, the second cutter blade 22 moves to the cutting edge 22a where it can contact the first cutter blade 21.

As shown in FIGS. 6A-6D, when the compound gear 40 turns further, the intermittent teeth part 43a of the compound gear 40 meshes with the transfer gear 51 a specific time after driving the drive motor 31 starts. More specifically, the intermittent teeth part 43a meshes with the transfer gear 51 when the intermittent teeth part 43a has turned angle θ from when the drive motor 31 starts driving. In this example, angle θ is 90 degrees or more.

Figure 6D:
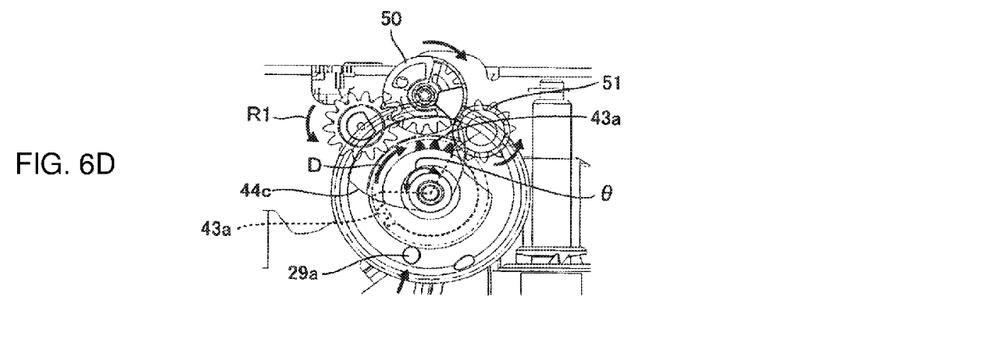
Figure 7A:
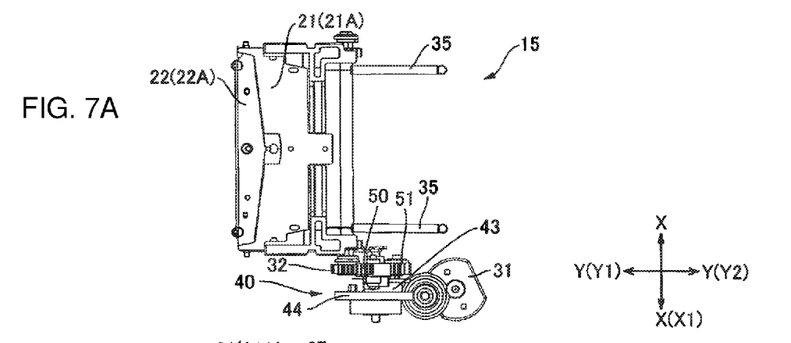
FIGS. 7A-7D illustrate the recording paper cutting operation of the cutter.
Figures 7B, 7C:
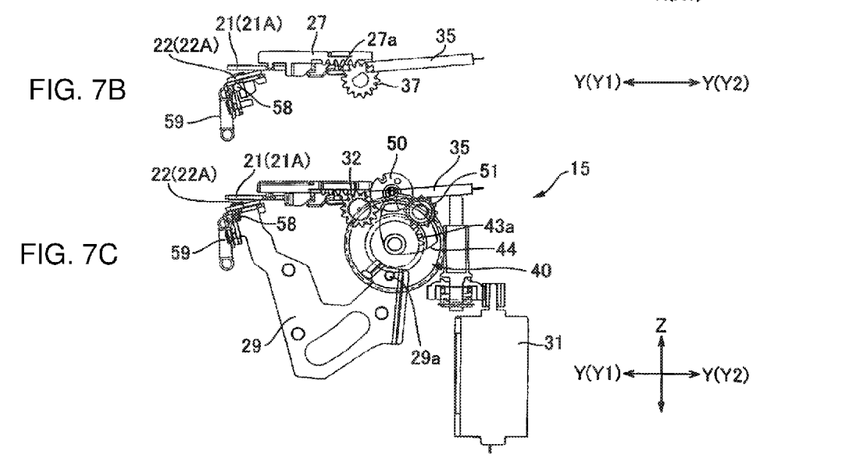
Figure 7D:
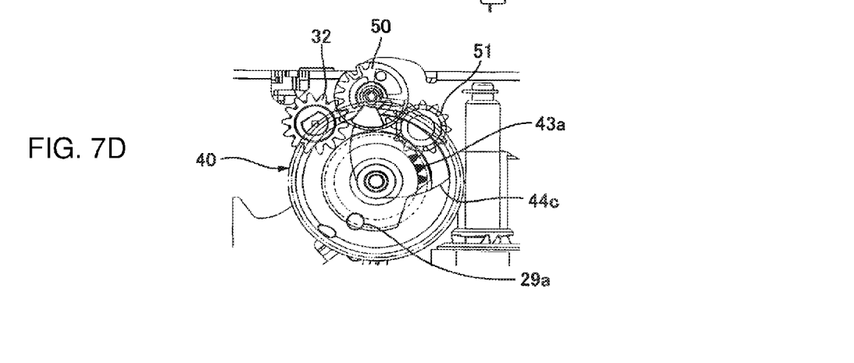

When the intermittent teeth part 43a of the compound gear 40 and the transfer gear 51 mesh as shown in FIG. 6D, the transfer gear 51 turns counterclockwise. The idler gear 50 meshed with the transfer gear 51 also turns clockwise. The drive gear 32 meshed with the idler gear 50 turns counterclockwise in the first direction of rotation R1. While the intermittent teeth part 43a of the compound gear 40 is meshed with the transfer gear 51, the drive gear 32 turns a specific rotational angle in the first direction of rotation R1.

Rotation of the drive gear 32 a specific angle in the first direction of rotation R1 is converted by the rotary to linear conversion mechanism 33 to linear motion of the first cutter blade 21 to the front Y1. The first cutter blade 21 therefore moves a specific distance from the retracted position 21B to the forward position 21A. As a result, the first cutter blade 21 passes the cutting position B on the conveyance path 16 while the knife edge 21b is touching the knife edge 22b of the second cutter blade 22, and reaches the forward position 21A. The recording paper 3 disposed at the cutting position B is thus cut. The coil springs 35 store urging force while the first cutter blade 21 moves to the forward position 21A.

As shown in FIGS. 7A-7D, when the first cutter blade 21 reaches the forward position 21A, the intermittent teeth part 43a of the compound gear 40 and the transfer gear 51 are no longer meshed. As a result, because rotation of the compound gear 40 is not transferred to the drive gear 32, the first cutter blade 21 stops moving at the forward position 21A. When the first cutter blade 21 is at the forward position 21A, the drive gear 32 meshes with the back end part of the rack 27a of the rack member 27.

When the intermittent teeth part 43a of the compound gear 40 is not engaged with the transfer gear 51, the rotation transfer path of the transfer mechanism 34 from the drive motor 31 to the drive gear 32 is interrupted, and the transfer gear 51, idler gear 50, and drive gear 32 turn freely. Therefore, as shown in FIGS. 8A-8D, the first cutter blade 21 is returned from the forward position 21A to the retracted position 21B by the urging force of the coil springs 35. The first cutter blade 21 is thus set to the retracted position 21B.

When the first cutter blade 21 returns to the retracted position 21B, the urging force of the coil springs 35 is transferred from the rack member 27 to the drive gear 32.

The drive gear 32 therefore turns a specific rotational angle in the second direction of rotation R2 opposite the first direction of rotation R1. The drive gear 32 therefore meshes with the front end of the rack 27*a* of the rack member 27 when the first cutter blade 21 is at the retracted position 21B.

Figure 8A:
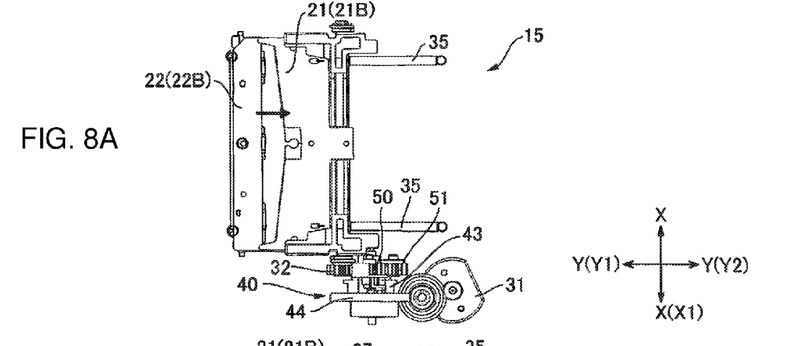
FIGS. 8A-8D are illustrate the recording paper cutting operation of the cutter.
Figures 8B, 8C:
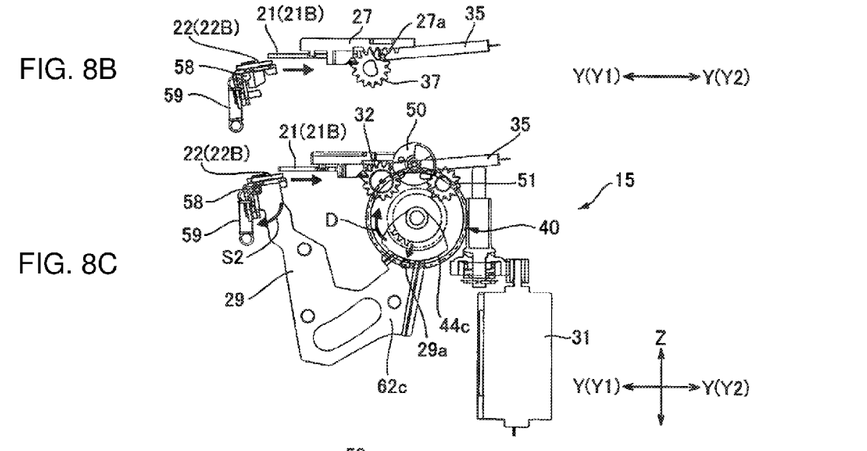
Figure 8D:
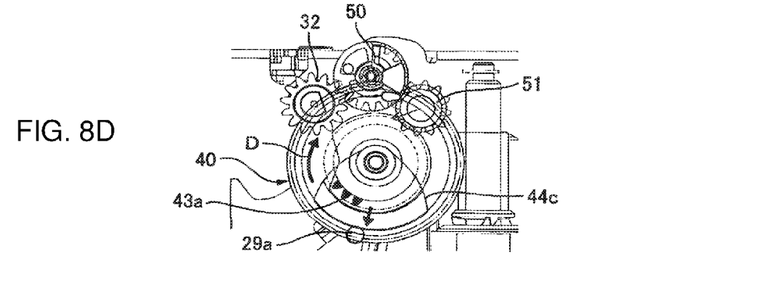

Synchronized to disengagement of the intermittent teeth part 43*a* of the compound gear 40 and the transfer gear 51, the cam 44*c* of the compound gear 40 contacts the cam follower 29*a* of the support frame 29 that supports the second cutter blade 22. As a result, as shown in FIG. 8C, the back frame part 62*c* of the support frame 29 is pushed down, and the support frame 29 rocks clockwise S2 on the support shaft 58. As a result, the second cutter blade 22 moves to the release position 22B separated from the first cutter blade 21.

The drive motor 31 then stops. More specifically, when the drive time of the drive motor 31 reaches a specific drive time after the first cutter blade 21 is set to the retracted position 21B, the drive motor 31 stops. As a result, the cutter 15 returns to the standby position shown in FIGS. 5A-5D.

In the standby position shown in FIGS. 5A-5D, the intermittent teeth part 43*a* of the compound gear 40 is at an angular position separated from the transfer gear 51, and not meshed with the transfer gear 51. The cam follower 29*a* of the support frame 29 that supports the second cutter blade 22 is in contact with the cam 44*c* of the compound gear 40. As a result, the back frame part 62*c* of the support frame 29 is pushed down against the urging force of the coil springs 35, and the second cutter blade 22 is at the release position 22B separated from the first cutter blade 21.

When the printer 1 is in this standby position and the cover 8 is opened to the open position 8B to load a paper roll 2, for example, the platen roller 17, first cutter blade 21, rack member 27, drive gear 32, upstream transfer mechanism 41 (idler gear 50 and transfer gear 51), and coil springs 35 move with the cover 8, but when in the standby position, the intermittent teeth part 43*a* of the compound gear 40 are in a position not meshed with the transfer gear 51. As a result, the operation of opening the cover 8 is not obstructed by meshing of the transfer gear 51 with the intermittent teeth part 43*a* of the compound gear 40.

The transfer gear 51 and the intermittent teeth part 43*a* of the compound gear 40 also do not collide when the cover 8 closes from the open position 8B to the closed position 8A. In addition, because the second cutter blade 22 is at the release position 22B when in the standby position, the knife edge 22*b* of the second cutter blade 22 is below the plane of travel 23 of the first cutter blade 21. The knife edge 22*b* of the second cutter blade 22 therefore does not protrude from the main case 6 even when the cover 8 is at the open position 8B, and is safe.

Figure 9:
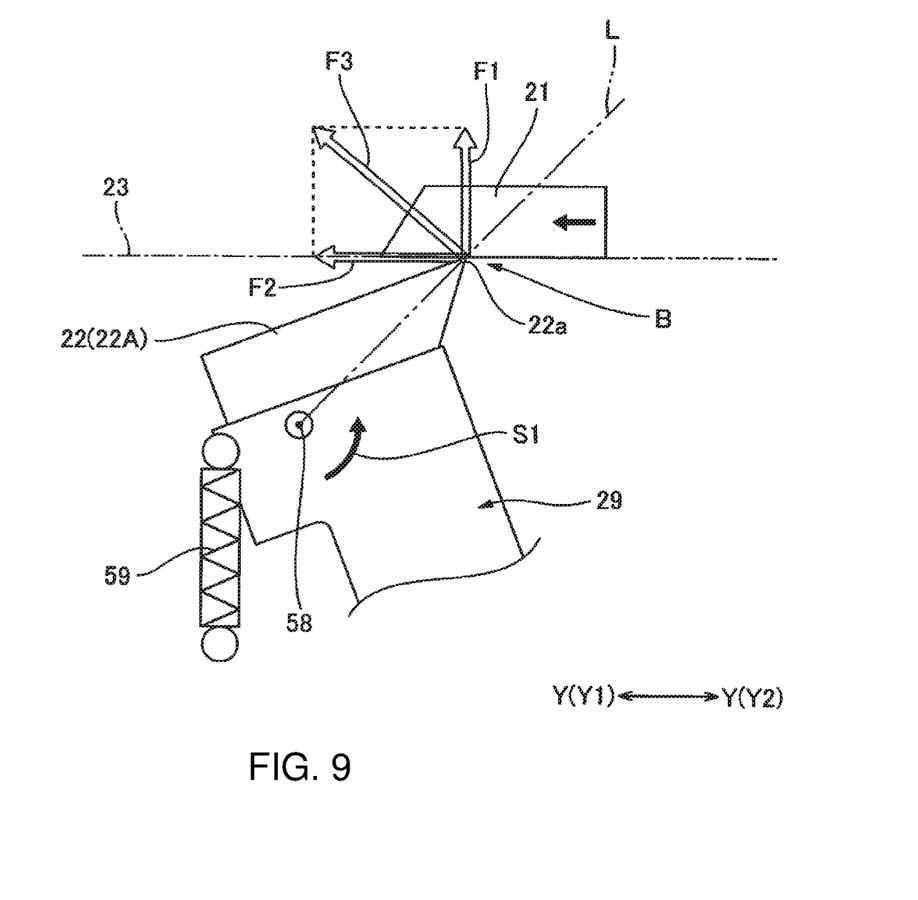
FIG. 9 describes the forces applied to the second cutter blade when cutting recording paper.

The forces applied to the cutting edge 22*a* of the second cutter blade 22 when cutting the recording paper 3 are described below. FIG. 9 is used to describe the forces applied to the cutting edge 22*a* of the second cutter blade 22 when cutting the recording paper 3. As shown in FIG. 9, the second cutter blade 22 is inclined when in the contact position 22A. More specifically, when the second cutter blade 22 is set to the contact position 22A, an imaginary line L between the cutting edge 22*a* and the support shaft (rotary shaft) 58 that is the pivot axis of the second cutter blade 22 is inclined to the plane of travel 23.

The urging force F1 of the urging members 59 that urge the support frame 29 counterclockwise (S1) on the support shaft 58 works from the cutting edge 22*a* of the second cutter blade 22 toward the first cutter blade 21 in the direction perpendicular to the plane of travel 23.

The recording paper cutting load F2 produced when cutting the recording paper 3 at the cutting position B works from the cutting edge 22*a* of the second cutter blade 22 along the plane of travel 23 to the front Y1 in the direction the first cutter blade 21 moves.

The second cutter blade 22 is supported pivotably on the support shaft 58, which is parallel to the plane of travel 23. Therefore, the combined force F3 of the urging force F1 of the urging members 59 and the recording paper cutting load F2 therefore works on the cutting edge 22*a* of the second cutter blade 22 as a moment around the support shaft 58 when cutting the recording paper 3. This moment pushes the cutting edge 22*a* of the second cutter blade 22 to the first cutter blade 21 side. The second cutter blade 22 can therefore be pushed to the contact position 22A in this embodiment using the recording paper cutting load F2 produced when cutting the recording paper 3 in addition to the urging force F1 of the urging members 59. The second cutter blade 22 can therefore be moved against the first cutter blade 21 with sufficient force when cutting even if the urging force F1 produced by the urging members 59 is decreased. More specifically, wear of the first cutter blade 21 and second cutter blade 22 can be suppressed because the urging force F1 produced by the urging members 59 can be reduced. Furthermore, the load on the first cutter blade moving mechanism 24, which moves the first cutter blade 21, can be reduced.

When the recording paper cutting load F2 increases when cutting thick recording paper 3, for example, the moment working on the second cutter blade 22 increases in conjunction with the increase in the recording paper cutting load F2, and the second cutter blade 22 is pushed against the first cutter blade 21 with greater force. Even thick recording paper 3 can therefore be cut cleanly.

When the cutter 15 is in the standby position in this example, the intermittent teeth part 43*a* of the compound gear 40 and the transfer gear 51 are separated by an angle, which is 90 degrees or more, around the compound gear 40. Therefore, the intermittent teeth part 43*a* and the transfer gear 51 mesh and form a rotation transfer path after turning of the compound gear 40 is started by drive power from the drive motor 31. In other words, there is a time difference (delay) in this example between when the drive motor 31 starts driving and when the path through which rotation of the drive motor 31 is transferred to the drive gear 32 is completed.

Because the first cutter blade 21 is not moved until the path through which rotation is transferred is completed, the load on the drive motor 31 is reduced by the load required to move the first cutter blade 21. The speed of the drive motor 31 therefore increases during the delay between when driving the drive motor 31 starts and when moving the first cutter blade 21 starts. As the speed of the drive motor 31 increases, rotational kinetic energy is stored in the compound gear 40. Therefore, when the compound gear 40 and transfer gear 51 engage, the transfer gear 51 can be turned with greater drive force (rotational kinetic energy) than when the driving of the drive motor 31 starts with the compound gear 40 and transfer gear 51 already engaged. As a result, the drive gear 32 can be turned with greater force than the output power of the drive motor 31 when starting to move the first cutter blade. The cutter 15 can therefore be moved from the from the retracted position 21B to the forward position 21A using a relatively low output, low cost DC motor as the drive motor 31.

Note that rotational kinetic energy K is expressed by the following equation where I is the moment of inertia and N is the speed of rotation.

$$K = \tfrac{1}{2} \times I \times (2 \cdot n)^2$$

In this example, while the intermittent teeth part 43a of the compound gear 40 and the transfer gear 51 are meshed, the drive gear 32 turns in the first direction of rotation R1, causing the first cutter blade 21 to move from the retracted position 21B to the forward position 21A. The distance the first cutter blade 21 moves from the retracted position 21B to the forward position 21A can therefore be desirably set by controlling the period of engagement between the transfer gear 51 and the intermittent teeth part 43a of the compound gear 40. The first cutter blade 21 can therefore be accurately set to the forward position 21A.

The rotary to linear conversion mechanism 33 that moves the first cutter blade 21 in this example is a rack and pinion mechanism. By using a rack and pinion mechanism, the rotational angle of the drive gear 32 and the linear distance the first cutter blade 21 moves can be desirably controlled, and the first cutter blade 21 can be moved more accurately than when using a linkage mechanism for the rotary to linear conversion mechanism 33.

This embodiment of the invention has coil springs 35 that urge the first cutter blade 21 from the forward position 21A to the retracted position 21B, and when the intermittent teeth part 43a of the compound gear 40 and the transfer gear 51 disengage, the urging force of the coil springs 35 moves the first cutter blade 21 from the forward position 21A to the retracted position 21B. Returning the first cutter blade 21 to the retracted position 21B is therefore simple. The first cutter blade 21 can also return to the retracted position 21B at a relatively high speed.

In this example, the second cutter blade moving mechanism 25 moves the second cutter blade 22 from the contact position 22A to the release position 22B before the first cutter blade 21 moves from the forward position 21A to the retracted position 21B. As a result, contact between the first cutter blade 21 and second cutter blade 22 can be released throughout the return path of the first cutter blade 21 from the forward position 21A to the retracted position 21B. Wear of the two cutter 15 blades after cutting the recording paper 3 can therefore be prevented.

Furthermore, because a DC motor with relatively low output and cost can be used as the drive motor 31, the manufacturing cost of the cutter 15 can be reduced. The manufacturing cost of a printer with the cutter 15 can therefore also be reduced.

The drive gear 32 may also function as the transfer gear 51. More specifically, the intermittent teeth part 43a of the compound gear 40 may mesh with the drive gear 32. This makes it possible to eliminate the transfer gear 51, thereby reducing the number of parts. In addition, the intermittent teeth part 43a of the compound gear 40 and the drive gear 32 are still separated 90 degrees around the axis of rotation of the compound gear 40 when the cutter 15 is at the standby position, and the rotation transfer path is completed by the intermittent teeth part 43a and the drive gear 32 engaging after rotation of the compound gear 40 is started by drive power from the drive motor 31.

The invention being thus described, it will be apparent that it may be varied in many ways. Such variations are not to be regarded as a departure from the spirit and scope of the invention, and all such modifications as would be apparent to one skilled in the art are intended to be included within the scope of the following claims.

What is claimed is:

1. A cutter blade moving mechanism configured to move a cutter blade reciprocally between a forward position cutting a sheet medium and a retracted position separated from the forward position, comprising:
   a first gear;
   a second gear;
   a rotation conversion mechanism configured to move a cutter blade forward and back by rotation of the first gear;
   a drive motor;
   an intermittent gear;
   a transfer mechanism configured to transfer rotation from the drive motor through the intermittent gear to the first gear;
   wherein a toothed part of the intermittent gear engages the second gear after the drive motor starts turning the intermittent gear; and
   while the toothed part of the intermittent gear is engaged with the second gear and rotation from the drive motor is transferred to the first gear, the cutter blade is moved by the rotation conversion mechanism from the retracted position to the forward position; and
   the intermittent gear rotates about an axis substantially parallel to axes about which the first and second gears rotate.

2. The cutter blade moving mechanism of claim 1, wherein:
   the second gear of the transfer mechanism is on a downstream side of the rotational path of the intermittent gear.

3. The cutter blade moving mechanism of claim 2, wherein:
   the transfer mechanism has a third gear,
   the third gear is located between the first gear and the second gear,
   the third gear meshes with the first gear, and
   the third gear meshes with the second gear.

4. The cutter blade moving mechanism of claim 1, wherein:
   the rotation conversion mechanism is a rack and pinion mechanism.

5. The cutter blade moving mechanism of claim 1, further comprising:
   an urging member configured to urge the cutter blade, wherein the urging force of the urging member moves the cutter blade from the forward position to the retracted position when the toothed part of the intermittent gear and the second gear disengage.

6. The cutter blade moving mechanism of claim 1, wherein:
   the drive motor is a DC motor.

7. A cutter, comprising:
   the cutter blade moving mechanism of claim 1;
   a first cutter blade that is moved between the forward position and the retracted position by the cutter blade moving mechanism; and
   a second cutter blade configured to contact the first cutter blade when the first cutter blade moves from the retracted position to the forward position.

8. The cutter described in claim 7, further comprising:
   a support mechanism configured to support the second cutter blade parallel to a travel plane of bidirectionally movement of the first cutter blade, and pivotably on an axis of rotation perpendicular to a direction of travel of the first cutter blade; and an urging member configured to urge the second cutter blade to a contact position where the cutting edge of the second cutter blade can slide against the first cutter blade;

wherein the second cutter blade contacts the first cutter blade at the contact position with an imaginary line between the axis of rotation and the cutting edge of the second cutter blade at an incline to the travel plane of the first cutter blade.

9. The cutter described in claim 8, further comprising:

a second cutter blade moving mechanism configured to rock the second cutter blade on its axis of rotation between a release position where the cutting edge is separated from the travel plane, and the contact position;

the second cutter blade moving mechanism setting the second cutter blade to the release position before the cutter blade moving mechanism moves the first cutter blade from the forward position to the retracted position.

10. A printer comprising:

the cutter described in claim 7;

a printhead; and a conveyance mechanism configured to convey sheet media through a conveyance path passing a printing position of the printhead and a cutting position of the cutter.

11. A cutter comprising:

a cutter blade moving mechanism configured to move a cutter blade reciprocally between a forward position cutting a sheet medium and a retracted position separated from the forward position, said cutter blade moving mechanism comprising:

a first gear;

a second gear;

a rotation conversion mechanism configured to move a cutter blade forward and back by rotation of the first gear;

a drive motor;

an intermittent gear;

a transfer mechanism configured to transfer rotation from the drive motor through the intermittent gear to the first gear, wherein a toothed part of the intermittent gear engages the second gear after the drive motor starts turning the intermittent gear, and while the toothed part of the intermittent gear is engaged with the second gear and rotation from the drive motor is transferred to the first gear, the cutter blade is moved by the rotation conversion mechanism from the retracted position to the forward position;

a first cutter blade that is moved between the forward position and the retracted position by the cutter blade moving mechanism; and a second cutter blade configured to contact the first cutter blade when the first cutter blade moves from the retracted position to the forward position.

* * * * *